United States Patent
Ko et al.

(10) Patent No.: US 12,340,068 B2
(45) Date of Patent: *Jun. 24, 2025

(54) ELECTRONIC DEVICE AND METHOD FOR DISPLAYING HISTORY OF EXECUTED APPLICATION THEREOF

(71) Applicant: Samsung Electronics Co., Ltd., Gyeonggi-do (KR)

(72) Inventors: Jeong Won Ko, Seoul (KR); Mun Hwi Kim, Gyeonggi-do (KR); Joon Hwan Kim, Gyeonggi-do (KR); Hye Jin Kim, Seoul (KR); Kyung Wook Ro, Seoul (KR); Myoung Soo Park, Gyeonggi-do (KR); Jung Woo Shin, Gyeonggi-do (KR); Ji Hun Lee, Seoul (KR); Han Ju Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,538

(22) Filed: Apr. 17, 2023

(65) Prior Publication Data

US 2023/0251759 A1 Aug. 10, 2023

Related U.S. Application Data

(63) Continuation of application No. 17/705,514, filed on Mar. 28, 2022, now Pat. No. 11,630,553, which is a (Continued)

(30) Foreign Application Priority Data

Jan. 4, 2017 (KR) .................. 10-2017-0001548

(51) Int. Cl.
*G06F 3/0482* (2013.01)
*G06F 1/16* (2006.01)
(Continued)

(52) U.S. Cl.
CPC .......... *G06F 3/0482* (2013.01); *G06F 1/1616* (2013.01); *G06F 1/1652* (2013.01);
(Continued)

(58) Field of Classification Search
None
See application file for complete search history.

(56) References Cited

U.S. PATENT DOCUMENTS 8,522,279 B2 * 8/2013 Lee ...................... H04N 21/482
725/47
9,152,299 B2 10/2015 McCann et al.
(Continued)

FOREIGN PATENT DOCUMENTS

CN 104850392 A 8/2015
CN 106030487 A 10/2016
(Continued)

OTHER PUBLICATIONS

European Search Report dated May 31, 2023.
(Continued)

*Primary Examiner* — Toan H Vu
(74) *Attorney, Agent, or Firm* — Cha & Reiter, LLC

(57) ABSTRACT

Disclosed is an electronic device that includes a display that outputs execution screens of a plurality of applications, a memory that stores the plurality of applications, and a processor electrically connected with the display and the memory. The processor retrieves a history of one or more applications among the plurality of applications that were previously executed in the electronic device, in response to a user input detected by the electronic device and outputs the history on the display based on information about the one or more applications and information about layouts of execution screens of the one or more applications. If at least one of the one or more applications is selected from the history,
(Continued)

the processor outputs an execution screen of the selected application on the display according to the corresponding layout.

15 Claims, 14 Drawing Sheets

Related U.S. Application Data continuation of application No. 17/184,744, filed on Feb. 25, 2021, now Pat. No. 11,287,954, which is a continuation of application No. 16/871,344, filed on May 11, 2020, now Pat. No. 10,963,131, which is a continuation of application No. 15/860,879, filed on Jan. 3, 2018, now Pat. No. 10,649,627.

(51) Int. Cl.
*G06F 3/048* (2013.01)
*G06F 3/04886* (2022.01)
*G06F 9/451* (2018.01)
*G06F 9/48* (2006.01)

(52) U.S. Cl.
CPC .......... *G06F 3/048* (2013.01); *G06F 3/04886* (2013.01); *G06F 9/451* (2018.02); *G06F 9/48* (2013.01); *G06F 2203/04803* (2013.01); *G06F 2209/482* (2013.01)

(56) References Cited

U.S. PATENT DOCUMENTS

| | | | |
|---|---|---|---|
| 9,483,172 B2 | 11/2016 | Urawaki et al. | |
| 9,652,111 B2 | 5/2017 | Ho | |
| 10,254,927 B2 | 4/2019 | Missig et al. | |
| 10,681,155 B1* | 6/2020 | Sanz | H04L 67/535 |
| 11,249,619 B2* | 2/2022 | Yang | G06F 3/0482 |
| 2005/0174589 A1 | 8/2005 | Tokiwa | |
| 2007/0070066 A1 | 3/2007 | Bakhash | |
| 2007/0176946 A1 | 8/2007 | Matoba | |
| 2010/0057854 A1* | 3/2010 | Chinnam | G06Q 10/10 |
| | | | 709/206 |
| 2011/0087989 A1 | 4/2011 | McCann et al. | |
| 2011/0093580 A1 | 4/2011 | Nagasaka et al. | |
| 2011/0209100 A1 | 8/2011 | Hinckley et al. | |
| 2011/0260964 A1* | 10/2011 | Mujkic | H04M 1/72472 |
| | | | 345/156 |
| 2012/0124615 A1 | 5/2012 | Lee | |
| 2012/0304229 A1 | 11/2012 | Choi et al. | |
| 2013/0055160 A1 | 2/2013 | Yamada et al. | |
| 2013/0227482 A1 | 8/2013 | Thorsander et al. | |
| 2013/0239049 A1* | 9/2013 | Perrodin | H04N 1/00453 |
| | | | 715/781 |
| 2013/0275910 A1* | 10/2013 | Kim | G06F 1/1652 |
| | | | 715/800 |
| 2013/0300684 A1 | 11/2013 | Kim et al. | |
| 2013/0305184 A1 | 11/2013 | Kim et al. | |
| 2014/0040819 A1 | 2/2014 | Duffy | |
| 2014/0047379 A1 | 2/2014 | Urawaki et al. | |
| 2014/0229888 A1 | 8/2014 | Ko et al. | |
| 2014/0325431 A1 | 10/2014 | Vranjes et al. | |
| 2014/0337794 A1 | 11/2014 | Vranjes et al. | |
| 2015/0143238 A1 | 5/2015 | Jung et al. | |
| 2015/0169183 A1 | 6/2015 | Son et al. | |
| 2015/0234558 A1 | 8/2015 | Ichikawa et al. | |
| 2015/0234579 A1 | 8/2015 | Ho | |
| 2015/0278990 A1 | 10/2015 | Lee et al. | |
| 2015/0324067 A1 | 11/2015 | Cabral | |
| 2015/0338888 A1 | 11/2015 | Kim et al. | |
| 2015/0347982 A1* | 12/2015 | Jon | G06F 3/0484 |
| | | | 705/7.19 |
| 2015/0355816 A1* | 12/2015 | Shim | H04L 67/02 |
| | | | 715/745 |
| 2016/0014275 A1* | 1/2016 | Omiya | H04M 3/42221 |
| | | | 379/265.03 |
| 2016/0098159 A1 | 4/2016 | McCann et al. | |
| 2016/0110152 A1 | 4/2016 | Choi et al. | |
| 2016/0165029 A1* | 6/2016 | Jegal | G06F 3/0482 |
| | | | 715/811 |
| 2016/0239203 A1 | 8/2016 | Sato et al. | |
| 2016/0301791 A1 | 10/2016 | Kim et al. | |
| 2017/0031526 A1* | 2/2017 | Hyde | G06F 3/041 |
| 2017/0195473 A1 | 7/2017 | Yun | |
| 2019/0149880 A1 | 5/2019 | Kim et al. | |
| 2020/0064979 A1 | 2/2020 | Luo et al. | |
| 2020/0319763 A1* | 10/2020 | Kim | G06F 9/451 |
| 2020/0371658 A1 | 11/2020 | Cho | |
| 2022/0011923 A1* | 1/2022 | Yook | G06F 3/0486 |

FOREIGN PATENT DOCUMENTS

| | | |
|---|---|---|
| KR | 10-2013-0126428 A | 11/2013 |
| KR | 10-2015-0107216 A | 9/2015 |
| WO | 2015/178714 A1 | 11/2015 |

OTHER PUBLICATIONS

Malaysia Office Action dated Apr. 18, 2023.
Vietnam Office Action dated Oct. 28, 2022.
Chinese Office Action dated Nov. 1, 2022.
Telephone Minutes dated Nov. 8, 2022.
Indian Office Action dated Feb. 8, 2023.
Korean Office Action dated Jan. 30, 2024.
Indian Office Action dated Apr. 3, 2024.

\* cited by examiner

ELECTRONIC DEVICE AND METHOD FOR DISPLAYING HISTORY OF EXECUTED APPLICATION THEREOF

CROSS REFERENCE TO RELATED APPLICATION(S)

This application is a Continuation of U.S. patent application Ser. No. 17/705,514, filed on Mar. 28, 2022 which is a Continuation of U.S. patent application Ser. No. 17/184,744, filed on Feb. 25, 2021 and assigned U.S. Pat. No. 11,287,954 issued on Mar. 29, 2022 which is a Continuation of U.S. patent application Ser. No. 16/871,344 filed on May 11, 2020 and assigned U.S. Pat. No. 10,963,131 issued on Mar. 30, 2021, which is a Continuation of U.S. patent application Ser. No. 15/860,879 filed on Jan. 3, 2018 and assigned U.S. Pat. No. 10,649,627 issued on May 12, 2020, which claims the benefit under 35 U.S.C. § 119(a) of a Korean patent application filed on Jan. 4, 2017 in the Korean Intellectual Property Office and assigned Serial number 10-2017-0001548, the entire disclosure of which is hereby incorporated by reference.

TECHNICAL FIELD

Embodiments disclosed herein generally relate to a technology for providing a history of applications executed in an electronic device.

BACKGROUND

As technology has developed, various forms of electronic products have been introduced into the marketplace. In particular, electronic devices such as smartphones, tablet PCs, wearable devices, and the like, each capable of a wide variety of functions, have been widely used. These electronic devices may execute various applications installed therein and may provide various functions to users through the applications. These electronic devices may support multi-tasking to simultaneously execute a plurality of applications. The electronic devices may also support multi-windowing to simultaneously output execution screens of the plurality of applications on their displays.

SUMMARY

An electronic device may display a history of applications executed therein on its display. For example, the electronic device may display a history that includes objects that respectively correspond to previously executed applications. If one of the objects in the history is selected, the electronic device may display the execution screen of the application corresponding to the selected object. However, when the electronic device supports multi-windowing, the history of applications may not reflect the layouts in which execution screens of the applications were previously displayed (e.g., the sizes in which the execution screens were displayed and the positions at which the execution screens were displayed). Accordingly, after selecting an object in the history, the user of the electronic device may have to set the layout of the corresponding application again so that the application is displayed in the same layout as before.

Aspects of the present disclosure are to address at least the above-mentioned problems and/or disadvantages and to provide at least the advantages described below. Accordingly, an aspect of the present disclosure is to provide an electronic device and a method for applying, to a history of applications, the layouts in which execution screens of the applications were previously displayed.

In accordance with an aspect of the present disclosure, an electronic device includes a display that outputs execution screens of a plurality of applications, a memory that stores the plurality of applications, and a processor electrically connected with the display and the memory. The processor retrieves a history of one or more applications among the plurality of applications that were previously executed in the electronic device, in response to a user input detected by the electronic device and outputs the history on the display based on information about the one or more applications and information about layouts of execution screens of the one or more applications. If at least one of the one or more applications is selected from the history, the processor outputs an execution screen of the selected application on the display according to the corresponding layout.

In accordance with another aspect of the present disclosure, an electronic device includes a housing having at least a part configured to be foldable, a flexible display outputting execution screens of a plurality of applications, a memory disposed inside the housing and storing the plurality of applications, and a processor disposed inside the housing and electrically connected with the flexible display and the memory. The processor retrieves a history of one or more applications among the plurality of applications that were previously executed in the electronic device, in response to a user input detected by the electronic device and outputs the history on the flexible display based on information about the one or more applications and information about layouts of execution screens of the one or more applications. If at least one of the one or more applications is selected from the history, the processor outputs an execution screen of the selected application on the flexible display according to the corresponding layout.

In accordance with another aspect of the present disclosure, a method includes retrieving a history of one or more applications that were previously executed in the electronic device in response to a user input detected by the electronic device, outputting the history based on information about the one or more applications and information about layouts of execution screens of the one or more applications, and if at least one of the one or more applications is selected from the history, outputting an execution screen of the selected application according to the corresponding layout.

According to embodiments disclosed herein, by providing a history of applications in which information about layouts of past execution screens is reflected, it is possible to simply and conveniently display execution screens of the applications in user-desired layouts on an electronic device that provides multi-windowing.

Furthermore, by providing a history of applications in a foldable electronic device, it is possible to provide a history appropriate for an activated area of the display of the foldable electronic device.

In addition, the present disclosure may provide additional advantages that are explicitly or implicitly disclosed below.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
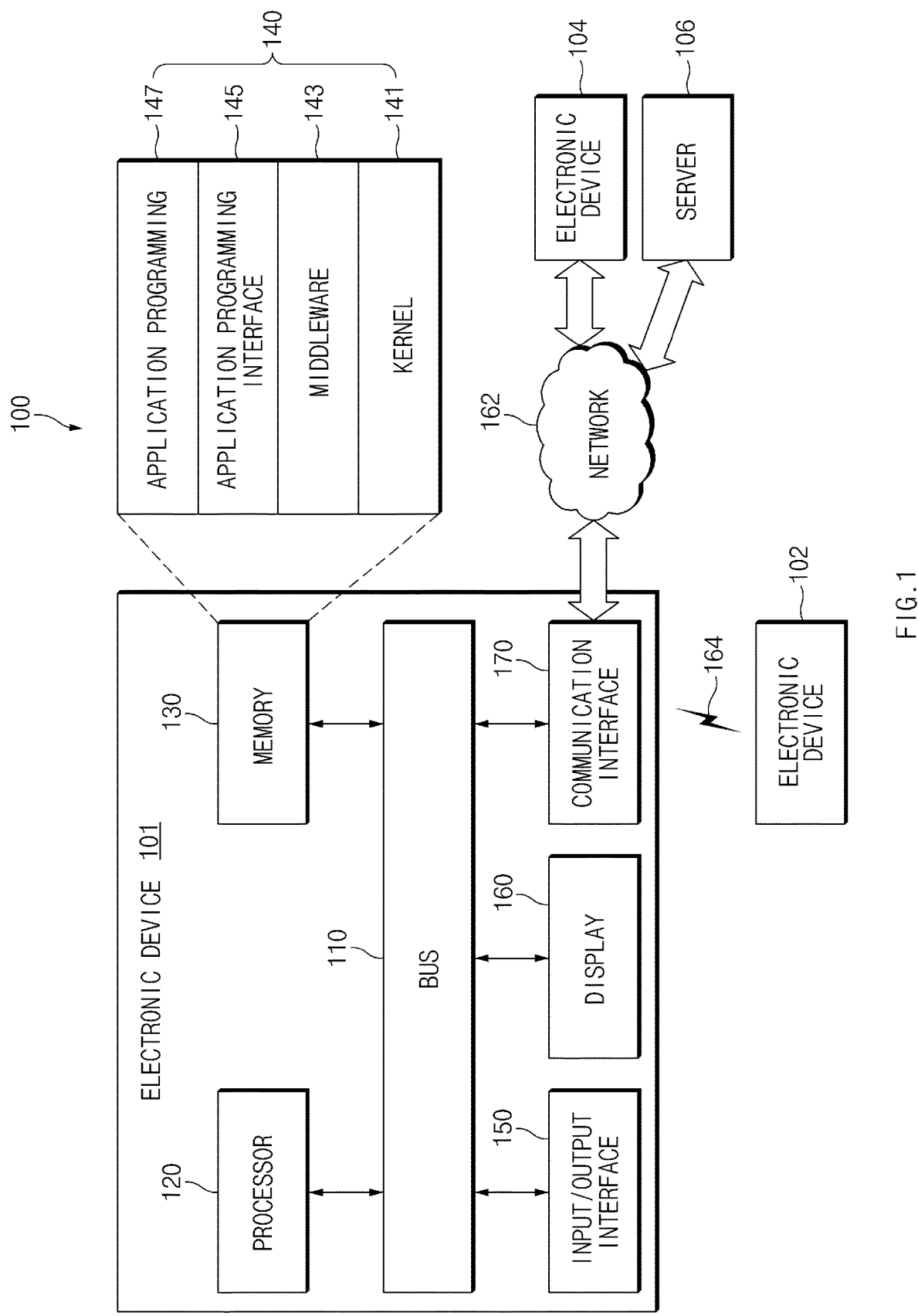
FIG. 1 illustrates an electronic device in a network environment according to an embodiment.

Hereinafter, various embodiments of the present disclosure may be described with reference to accompanying drawings. Accordingly, those of ordinary skill in the art will recognize that modifications, equivalents, and/or alternatives of the various embodiments described herein can be made without departing from the scope and spirit of the present disclosure. Singular forms may also include the plural unless otherwise specified. In this disclosure, the expressions "A or B," "at least one of A or/and B," or "one or more of A or/and B," and the like may include any and all combinations of one or more of the associated listed items. The terms such as "first," "second," and the like may be used to refer to various elements regardless of the order and/or the priority and to distinguish the associated elements from other elements, but they do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

Depending on the context, the expression "configured to" used in this disclosure may be used as, for example, the expression "suitable for," "having the capacity to," "adapted to," "made to," "capable of," or "designed to" in hardware or software. The expression "a device configured to" may mean that the device is "capable of" the corresponding operation or that the device may operate together with another device or other components to perform the operation. For example, a "processor configured to (or set to) perform A, B, and C" may mean a dedicated processor (e.g., an embedded processor) for performing the corresponding operation or a generic-purpose processor (e.g., a central processing unit (CPU) or an application processor) which performs the corresponding operation by executing one or more software programs stored in a memory device.

An electronic device according to various embodiments of this disclosure may be smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, wearable devices, etc. According to various embodiments, the wearable device may be in the forms of an accessory (e.g., watches, rings, bracelets, anklets, necklaces, glasses, contact lens, or head-mounted-devices (HMDs)), a fabric or garment-integrated device (e.g., electronic apparel), a body-attached device (e.g., skin pads or tattoos), or a bio-implantable device (e.g., implantable circuits). According to various embodiments, the electronic device may also be televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™, game consoles (e.g., Xbox™ or PlayStation™), electronic dictionaries, electronic keys, camcorders, electronic picture frames, and the like.

According to another embodiment, an electronic device may be various medical devices (e.g., various portable medical measurement devices (e.g., blood glucose monitoring devices, heartbeat measuring devices, blood pressure measuring devices, body temperature measuring devices, and the like), magnetic resonance angiography devices (MRA), magnetic resonance imaging devices (MM), computed tomography devices (CT), scanners, ultrasonic devices, etc.), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales devices (POSs) in stores, or Internet of Things (IoT) devices (e.g., light bulbs, sensors, sprinkler devices, fire alarms, thermostats, street lamps, toasters, exercise equipment, hot water tanks, heaters, boilers, and the like). According to yet another embodiment, the electronic device may be a part of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, the electronic devices according this disclosure may not be limited to the above-described electronic devices. In this disclosure, the term "user" may refer to a person who uses an electronic device or may refer to a device (e.g., an artificial intelligence electronic device) that uses the electronic device.

Referring to FIG. 1, according to one embodiment, an electronic device 101 in a network environment is described. The electronic device 101 may include a bus 110, a processor 120, a memory 130, an input/output interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a central processing unit (CPU), an application processor (AP), or a communication processor (CP). For example, the processor 120 may perform an arithmetic operation or data processing associated with control and/or communication of at least other elements of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)." For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., a command) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., text, images, videos, icons, symbols, and the like) to the user. The display 160 may include a touch screen and may receive, for example, touch, gesture, proximity, or hovering inputs from an electronic pen or a part of a user's body (e.g. a finger). The communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, global positioning system (GPS), global navigation satellite system (Glonass), Beidou navigation satellite system (hereinafter referred to as "Beidou"), or European global satellite-based navigation system (hereinafter referred to as "Galileo"). Hereinafter, in this disclosure, "GPS" and "GNSS" may be interchangeably used. The wired communication may be done via, for example, universal serial bus (USB), high definition multimedia interface (HDMI), recommended standard-232 (RS-232), power line communication, plain old telephone service (POTS), or the like. The network 162 may include at least one telecommunications networks, such as a computer network (e.g., LAN or WAN), the Internet, or a telephone network.

Each of the first and second external electronic devices 102 and 104 may be a device of which the type is different from or the same as that of the electronic device 101. According to one embodiment, all or a portion of operations that the electronic device 101 will perform may be executed by one or more other electronic devices (e.g., the first electronic device 102, the second electronic device 104 or the server 106). According to an embodiment, in the case where the electronic device 101 executes a function or service automatically or in response to a request, the electronic device 101 may perform the function or the service itself. Alternatively, it may request at least a portion of the function or service be performed by another electronic device (e.g., the electronic device 102 or 104 or the server 106). The other electronic device (e.g., the electronic device 102 or 104 or the server 106) may execute the requested function or portion of the function and may transmit the execution result to the electronic device 101. The electronic device 101 may provide the requested function or service using the received result or may additionally process the received result to provide the requested function or service. To this end, for example, various models of computing such as cloud computing, distributed computing, or client-server computing may be used.

Figure 2:
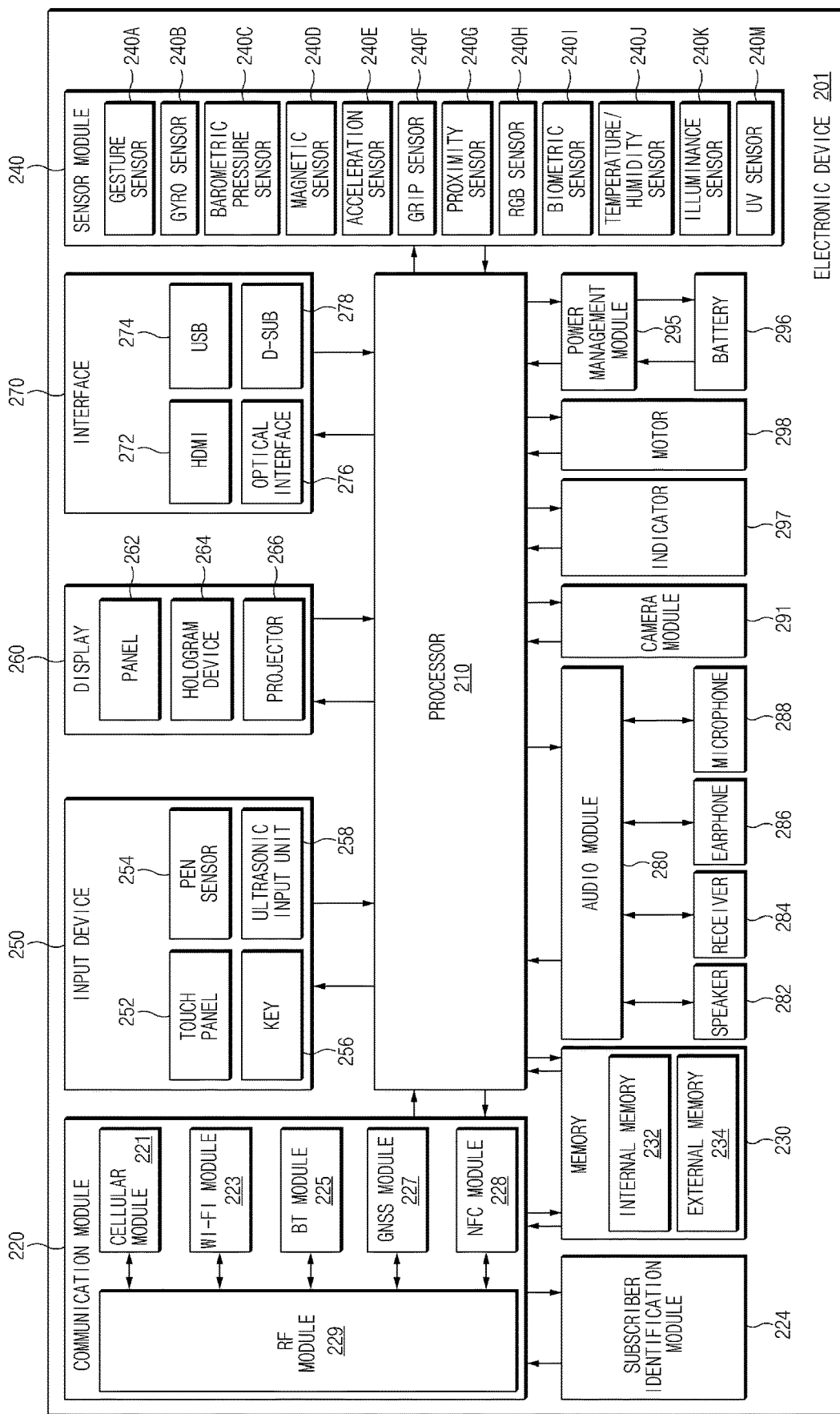
FIG. 2 is a block diagram of an electronic device according to an embodiment.

FIG. 2 illustrates a block diagram of an electronic device, according to one embodiment. An electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of other elements illustrated in FIG. 2. The processor 210 may load instructions or data received from at least one of the other elements (e.g., the nonvolatile memory) into a volatile memory and process the loaded instructions or data. The processor 210 may store the resulting data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). The RF module 229 may include a transceiver, a power amplifier module (PAM), a frequency filter, a low noise amplifier (LNA), an antenna, or the like.

According to another embodiment, at least one of the cellular module 221, the Wi-Fi module 223, the BT module 225, the GNSS module 227, or the NFC module 228 may transmit and receive the RF signal through a separate RF module. The subscriber identification module 224 may include, for example, a card and/or embedded SIM that includes a subscriber identification module and may include unique identifying information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash memory card in various formats such as compact flash (CF), secure digital (SD), micro secure digital (Micro-SD), mini secure digital (Mini-SD), extreme digital (xD), multimedia card (MMC), memory stick, or the like. The external memory 234 may be operatively and/or physically connected to the electronic device 201 through various interfaces.

The sensor module 240 may measure various physical quantities or may detect various operation states of the electronic device 201. The sensor module 240 may convert the measured or detected information to electric signals. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide tactile feedback to a user. The (digital) pen sensor 254 may be, for example, a part of the touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., the microphone 288) and may generate an electrical signal corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as a sensor separate from the touch panel 252. The hologram device 264 may display stereoscopic images in a space using light interference phenomenon. The projector 266 may project images onto a screen. For example, the screen may be incorporated within the electronic device 201 or be a separate component. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert sounds into electric signals and vice versa. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. The camera module 291 may capture still images or videos. According to an embodiment, the camera module 291 may include at least one or more image sensors (e.g., a front sensor or a rear sensor), a lens, an image signal processor (ISP), and/or a flash (e.g., an LED or a xenon lamp). The power management module 295 may manage the power supplied to the various components of the electronic device 201. According to an embodiment, a power management integrated circuit (PMIC), a charger IC, or a battery or fuel gauge may be included in the power management module 295. The PMIC may allow the electronic device to be charged using via wire or wirelessly. The wireless charging method may be done via magnetic resonance, magnetic induction, or electromagnetic resonance/induction. Wireless charging may employ additional circuits such as coil loops, resonant circuits, rectifiers, or the like. The battery gauge may measure, for example, the charge remaining in the battery 296 and the voltage, current or temperature thereof while the battery is charged. The battery 296 may include, for example, a rechargeable battery and/or a solar battery.

The indicator 297 may display indications for one or more specific states of the electronic device 201 or a part thereof (e.g., the processor 210). For example, the indicator 297 may indicate when the electronic device 201 is booting, is charging, has received a message, etc. The motor 298 may convert an electrical signal into a mechanical vibration to provide haptic feedback to the user. The electronic device 201 may additionally include a processing device (e.g., a GPU) for supporting mobile TV. The processing device for supporting mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be implemented with one or more components, and the names of the elements may be changed depending on the type of the electronic device. In various embodiments, some elements of the electronic device (e.g., the electronic device 201) may be omitted or other additional elements may be added. Furthermore, some of the elements of the electronic device may be combined with each other so as to form an integrated component, but the functions of the elements may be performed in the same manner as before the integration.

Figure 3:
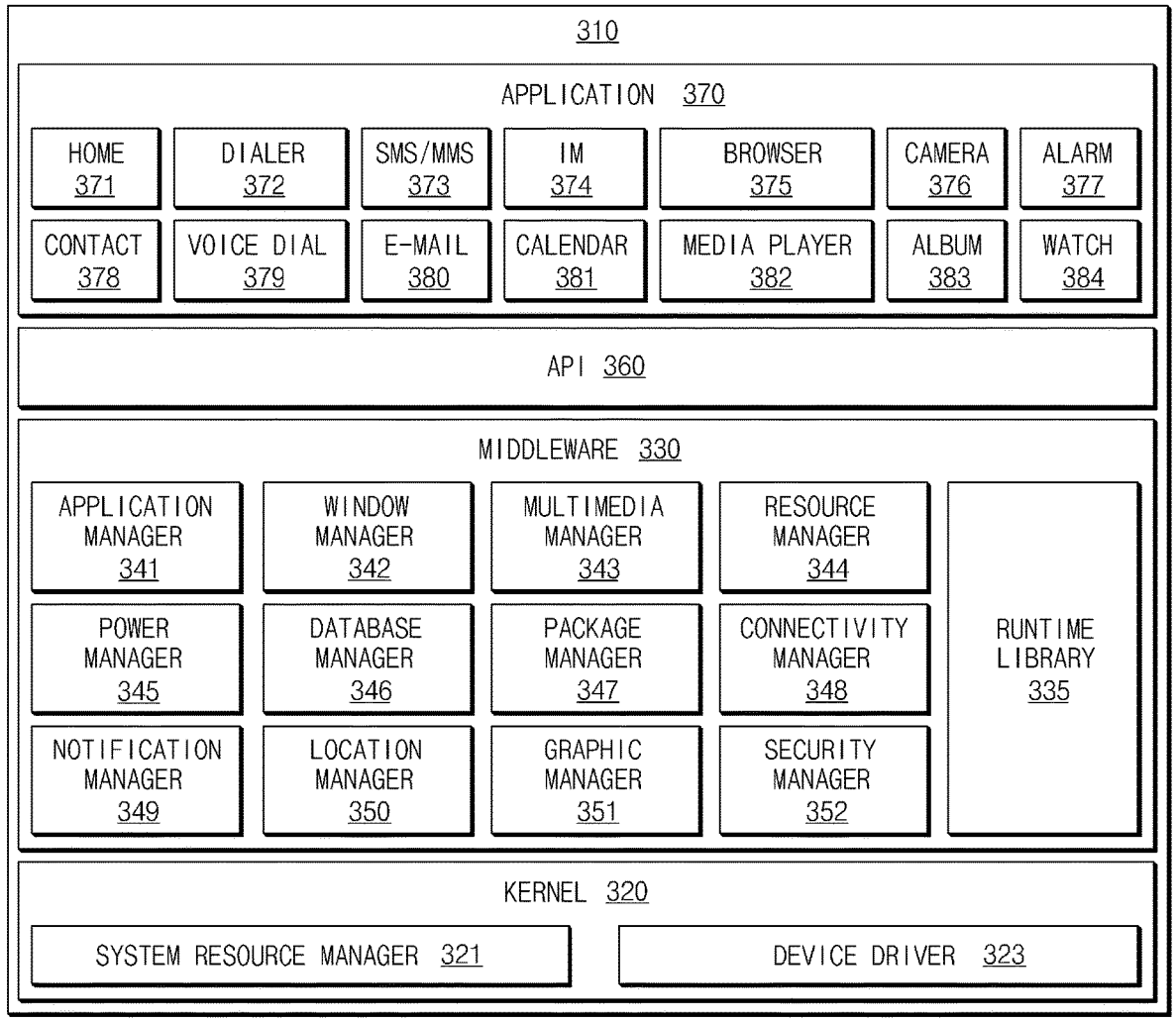
FIG. 3 is a block diagram of a program module according to an embodiment.

FIG. 3 illustrates a block diagram of a program module, according to one embodiment. According to an embodiment, the program module 310 (e.g., the program 140) may include an operating system (OS) to control resources associated with an electronic device (e.g., the electronic device 101), and/or various applications (e.g., the application program 147) executing in the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on the electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, functions that the various applications 370 commonly need, and may provide these functions to the applications 370 through the API 360 to allow the applications 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add new functions to the applications 370 while the application 370 is being executed. The runtime library 335 may perform input/output management, memory management, or capacities about arithmetic functions. The application manager 341 may manage, for example, a life cycle of at least one application. The window manager 342 may manage a graphic user interface (GUI) resource that is used in the display of the electronic device. The multimedia manager 343 may identify a format necessary for playing various media files, and may perform encoding or decoding of the media files by using a codec suitable for the identified format. The resource manager 344 may manage resources such as memory space or source code of the applications 370. The power manager 345 may manage battery or power, and may provide power information for various operations of the electronic device. According to an embodiment, the power manager 345 may operate with a basic input/output system (BIOS). The database manager 346 may generate, search for, or modify databases that are used by the applications 370. The package manager 347 may install or update the applications 370, to the extent the applications and/or their updates are distributed as package files.

The connectivity manager 348 may manage, for example, wireless connections. The notification manager 349 may provide notifications to the user for various events, such as when a message arrives, when the current time is getting close to the time of a calendar entry, when the device is at or near a preset location, etc. The location manager 350 may manage the location information of the electronic device. The graphic manager 351 may manage graphic effects displayed on the display, or manage the user interfaces relevant thereto. The security manager 352 may provide, for example, system security or user authentication. According to an embodiment, the middleware 330 may also include a telephony manager for managing voice or video calls and a middleware module that combines the various functions of the above-described elements. According to an embodiment, the middleware 330 may provide modules specialized to different OSes. Additionally, the middleware 330 may dynamically remove (i.e. unload) existing elements or may add new elements thereto. The API 360 may be, for example, a set of programming functions and may be provided with a configuration that is variable depending on the OS. For example, in the case Android or iOS, it may provide one API set per platform. In the case Tizen, it may provide two or more API sets per platform.

The application 370 may include, for example, applications such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, health care (e.g., measuring an exercise quantity, blood sugar, or the like) or an application that offers environment information (e.g., information of barometric pressure, humidity, temperature, or the like). According to an embodiment, the application 370 may include an information exchanging application to support information exchange between the electronic device and an external electronic device. The information exchanging application may include, for example, a notification relay application for transmitting specific information to the external electronic device, or a device management application for managing the external electronic device. For example, the notification relay application may transmit notification information, which may be generated by other applications, to the external electronic device. The notification relay application may also receive notification information from the external electronic device and provide the notification information to the user. The device management application may control various functions of the external electronic device, such as turn-on/turn-off of an external electronic device itself (or a part of components), adjustment of brightness (or resolution) of the display of the external electronic device, etc. According to an embodiment, the application 370 may include an application (e.g., a health care application of a mobile medical device) that communicates with the external electronic device. According to another embodiment, the application 370 may include an application that is received from the external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

Figure 4:
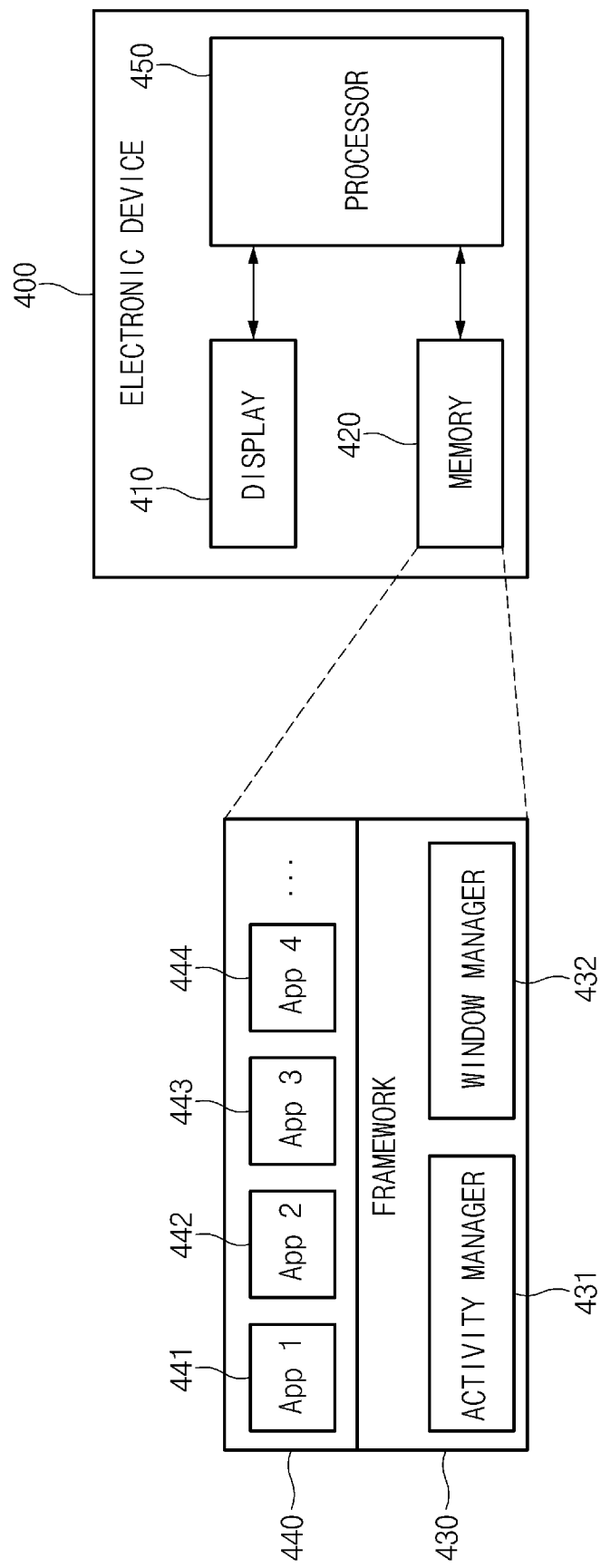
FIG. 4 is a block diagram illustrating a configuration of an electronic device according to an embodiment.

FIG. 4 is a block diagram illustrating a configuration of an electronic device according to an embodiment.

Referring to FIG. 4, an electronic device 400 according to an embodiment may include a display 410, a memory 420, and a processor 450. The electronic device 400 may be one of various types of devices, such as a desktop computer, a laptop computer, a smartphone, a tablet PC, a wearable device, and the like.

The display 410 may output images. The display 410 may output an execution screen of an application. For example, the display 410 may output at least a part of an execution screen of one of the applications 440. The display 410 may simultaneously output execution screens of two or more applications on different areas thereof. This is known in the art as multi-windowing. Thus, the multi-window function described herein may refer to the function of simultaneously displaying execution screens of two or more applications 440 on the display 410. The display 410 may also output a history that includes applications previously executed and currently running (e.g. running the background or the foreground) in the electronic device 400.

The memory 420 may store data. The memory 420 may be a volatile memory and/or a non-volatile memory. The memory 420 may store the plurality of applications 440. The plurality of applications 440 may include, for example, a first application 441, a second application 442, a third application 443, a fourth application 444, etc. The memory 420 may store a framework 430 (e.g., an application framework of Android). The framework 430 may include, for example, an activity manager 431, a window manager 432, etc.

The processor 450 may be electrically connected with the display 410 and the memory 420. The processor 450 may control the display 410 and the memory 420. The processor 450 may execute at least some of the plurality of applications 440. The processor 450 may generate or obtain various pieces of information by using the framework 430.

According to an embodiment, the processor 450 may display a history of one or more applications previously executed in the electronic device 400 (e.g., one or more applications previously executed or currently running in the electronic device 400). For example, in response to a user input for displaying the history, the processor 450 may display the history of the applications previously executed in the electronic device 400. The user input for displaying the history may be, for example, an input to a key (e.g., a home button, a menu key, a cancel key, a volume key, a power key, or the like) included in the electronic device 400 or a touch input on an icon for displaying the history.

Based on information about the one or more executed applications and information about the layouts of execution screens of the one or more executed applications, the processor 450 may output, on the display 410, the history.

The processor 450 may obtain information about the names of the one or more applications previously executed, the order (or time) that the one or more applications were executed, etc. The processor 450 may obtain the information about the one or more applications previously executed by using the framework 430 when the one or more applications are executed. The processor 450 may store at least part of the information about the one or more applications in the memory 420.

The processor 450 may obtain the information about the layouts of the applications that were previously executing. The layouts may include information about whether the multi-window function was applied to the one or more previously executed applications, the sizes in which the execution screens of the one or more applications were displayed, and/or the positions at which the execution screens of the one or more applications were displayed. The processor 450 may obtain the information about the layouts by using the framework 430 when the one or more applications are executed. For example, the processor 450 may use the activity manager 431 to obtain the information about whether the multi-window function was applied to the one or more applications. In another example, the processor 450 may use the window manager 432 to obtain the information about the sizes and/or positions in which the execution screens of the one or more applications were displayed. The processor 450 may store, in the memory 420, at least part of the information about the layouts of the execution screens together with the information about the one or more applications that were previously executed.

The processor 450 may select one or more applications from the history. For example, the processor 450 may select one or more applications based on a user input to the history after the history is displayed on the display 410.

According to an embodiment, if one or more applications is selected from the history, the processor 450 may output the execution screen of the selected application on the display 410 according to the corresponding layout. For example, the processor 450 may output the execution screen of the selected application on the display 410 in the same layout as when the selected application was previously executed. In another example, in the case where two or more applications simultaneously executed by using multi-windowing are selected, the processor 450 may simultaneously output the execution screens of the selected applications on the display 410 by using multi-windowing in the same layout as when the selected applications were executed.

Hereinafter, a history of executed applications, execution screens of the applications, and an exemplary operation of the electronic device 400 will be described in detail with reference to FIGS. 5 to 9.

According to an embodiment, in the case where two applications were previously simultaneously displayed using multi-windowing, the electronic device may subsequently provide a history based on the layout in which the two applications were displayed.

Figure 5:
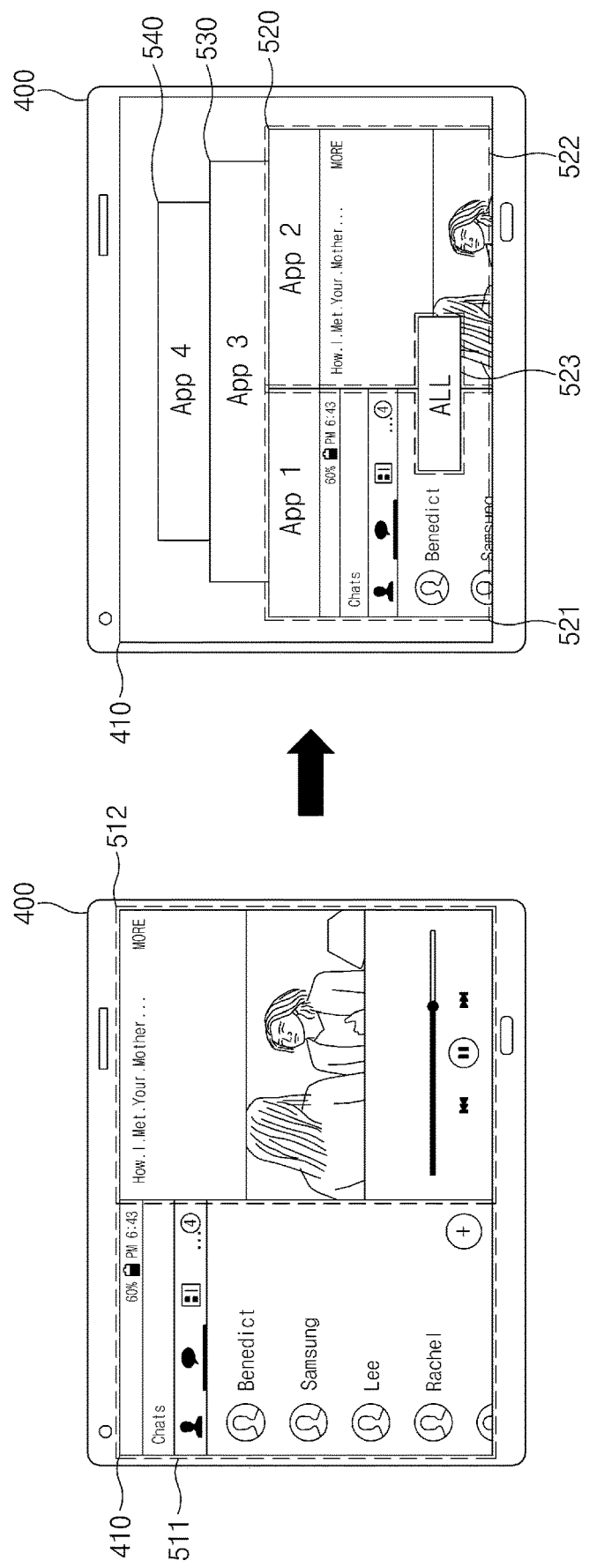
FIG. 5 illustrates application execution screens and a history of executed applications outputted on an electronic device, according to an embodiment.

FIG. 5 illustrates application execution screens and a history of executed applications outputted on an electronic device, according to an embodiment.

It may be understood that operations described as being performed by the electronic device 400 in the description of FIG. 5 are controlled by the processor 450 of the electronic device 400.

Referring to FIG. 5, the electronic device 400 according to an embodiment may execute a first application and a second application. The first application may be, for example, a messenger application, and the second application may be, for example, a video playback application.

According to an embodiment, the electronic device 400 may simultaneously display the execution screen 511 of the first application and the execution screen 512 of the second application on the display 410. For example, the electronic device 400 may display the execution screen 511 of the first application on the left side of the display 410 and the execution screen 512 of the second application on the right side of the display 410. The electronic device 400 may store information about the first application and information about the layout of the execution screen 511 of the first application (e.g., the size or position of the window of the first application). Furthermore, the electronic device 400 may store information about the second application and information about the layout of the execution screen 512 of the second application. After the first application and the second application are executed, upon a user request, the electronic device 400 may display the home screen or may execute another application.

The electronic device 400 may display a history of applications previously executed or currently running in the electronic device 400. For example, upon detecting a user input for displaying the history, the electronic device 400 may output the history on the display 410.

The history may include one or more objects corresponding to one or more of the previously executed applications. The one or more objects may include execution screens of the one or more applications arranged based on information about the layouts thereof. For example, in the case where execution screens of two or more applications are simultaneously output on the display 410, the history may include an object that includes the execution screens of the two or more applications arranged based on information about the layouts of the execution screens of the two or more applications.

For example, the electronic device 400 may output, on the display 410, a history that includes a first object 520 corresponding to the first and second applications, a second object 530 corresponding to a third application, and a third object 540 corresponding to a fourth application. The first object 520 may include, for example, at least a portion of the execution screen 511 of the first application and at least a portion of the execution screen 512 of the second application. The execution screen 511 of the first application and the execution screen 512 of the second application may be arranged in the first object 520 based on the earlier layouts of the executing screens of the first and second application, as shown in the left portion of FIG. 5. For example, the execution screen 511 of the first application and the execution screen 512 of the second application may be displayed in the first object 520 at the same ratio as the ratio at which the first and second applications were previously displayed while they were being executed.

According to an embodiment, the object that includes execution screens of two or more applications may include options for selecting all or a part of the two or more applications.

For example, the first object 520 may include a first area 521 for selecting the first application, a second area 522 for selecting the second application, and a third area 523 for simultaneously selecting the first application and the second application. Thus, in the case where the first application and the second application are simultaneously displayed using multi-windowing, the electronic device 400 may output the first object 520 that includes the third area 523 for simultaneously selecting the first application and the second application.

Operations after a selection of the first application and/or the second application will be described below in detail with reference to FIGS. 7 to 8.

According to an embodiment, in the case where three or more applications are simultaneously displayed using multi-windowing, the electronic device may provide a history based on the layout in which the three or more applications were previously displayed on the display.

Figure 6:
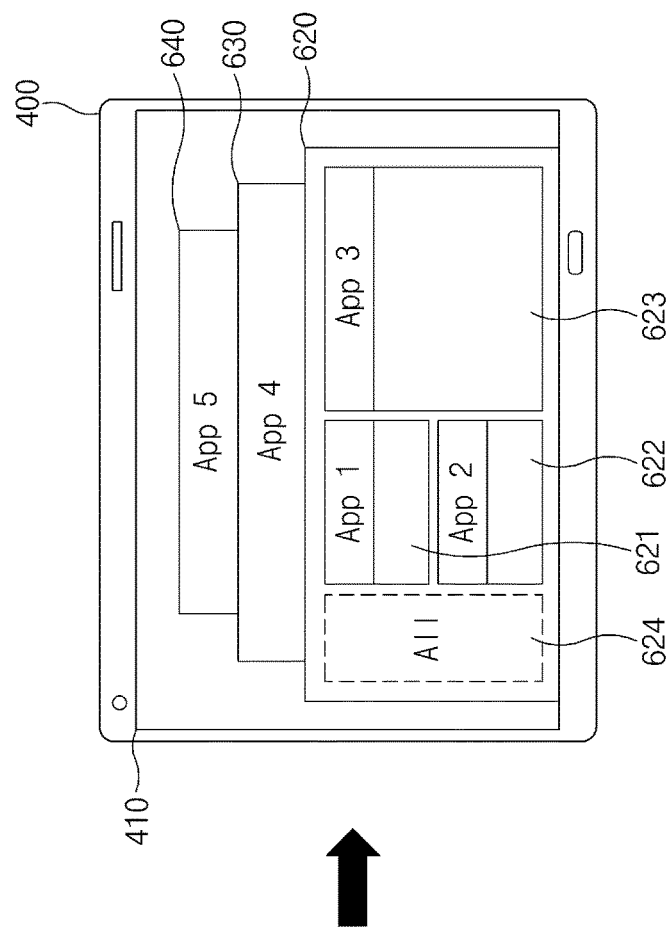
FIG. 6 illustrates application execution screens and a history of executed applications outputted on an electronic device, according to an embodiment.
Figure 6:
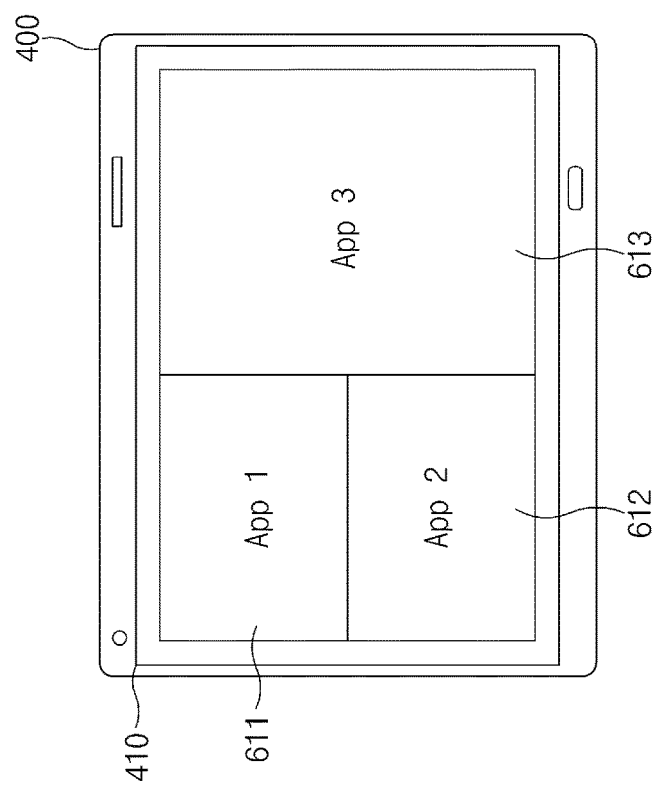

FIG. 6 illustrates application execution screens and a history of executed applications outputted on an electronic device, according to an embodiment.

It may be understood that operations described as being performed by the electronic device 400 in the description of FIG. 6 are controlled by the processor 450 of the electronic device 400.

Referring to FIG. 6, the electronic device 400 according to an embodiment may simultaneously execute a first application, a second application, and a third application and simultaneously display the execution screens thereof.

According to an embodiment, the electronic device 400 may simultaneously display, on the display 410, the execution screen 611 of the first application, the execution screen 612 of the second application, and the execution screen 613 of the third application. For example, the electronic device 400 may display the execution screen 611 of the first application on the upper left side of the display 410, the execution screen 612 of the second application on the lower left side of the display 410, and the execution screen 613 of the third application on the right side of the display 410. The electronic device 400 may store information about the first application, the second application, and the third application and information about the layout of the execution screen 611 of the first application, the layout of the execution screen 612 of the second application, and the layout of the execution screen 613 of the third application. After the first application, the second application, and the third application are executed, upon a user request, the electronic device 400 may display the home screen or may execute another application.

The electronic device 400 may display a history of executed applications. For example, upon detecting a user input for displaying the history, the electronic device 400 may output the history on the display 410.

For example, the electronic device 400 may output, on the display 410, a history that includes a first object 620 corresponding to the first to third applications, a second object 630 corresponding to a fourth application, and a third object 640 corresponding to a fifth application. The first object 620 may include, for example, at least a portion of the execution screen 611 of the first application, at least a portion of the execution screen 612 of the second application, and at least a portion of the execution screen 613 of the third application. The execution screen 611 of the first application, the execution screen 612 of the second application, and the execution screen 613 of the third application may be arranged in the first object 620 based on information about the layouts thereof. For example, the execution screen 611 of the first application, the execution screen 612 of the second application, and the execution screen 613 of the third application may be displayed in the first object 620 at the same ratio as the ratio at which the first application, the second application, and the third application were previously displayed while they were being executed.

The first object 620 may include, for example, a first area 621 for selecting the first application, a second area 622 for selecting the second application, a third area 623 for selecting the third application, and a fourth area 624 for simultaneously selecting the first application, the second application, and the third application. In the case where the first application, the second application, and the third application are simultaneously displayed using multi-windowing, the electronic device 400 may output the first object 620 that includes the fourth area 624 for simultaneously selecting the first application, the second application, and the third application. The first application may be selected if a user input is applied to the first area 621, the second application may be selected if a user input is applied to the second area 622, and the third application may be selected if a user input is applied to the third area 623. The first to third applications may be simultaneously selected if a user input is applied to the fourth area 624.

Thus, according to an embodiment, if one or more applications are selected from the provided history, the electronic device may provide execution screens of the selected applications, where the layouts in which the selected applications were previously displayed are again reproduced.

Figure 7:
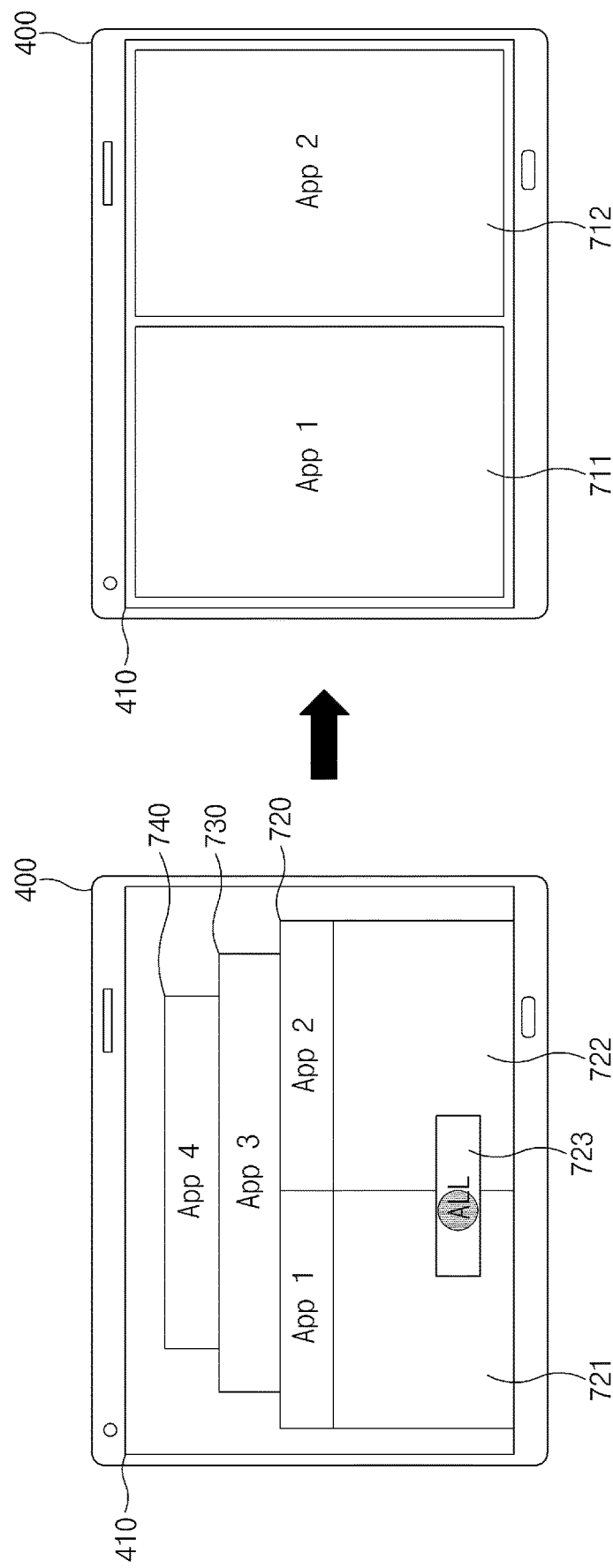
FIG. 7 illustrates application execution screens and a history of executed applications outputted on an electronic device, according to an embodiment.

FIG. 7 illustrates application execution screens and a history of executed applications outputted on an electronic device, according to an embodiment.

It may be understood that operations described as being performed by the electronic device 400 in the description of FIG. 7 are controlled by the processor 450 of the electronic device 400.

Referring to FIG. 7, the electronic device 400 according to an embodiment may output, on the display 410, a history that includes a first object 720 corresponding to the first and second applications, a second object 730 corresponding to a third application, and a third object 740 corresponding to a fourth application. The first object 720 may include a first area 721 for selecting the first application, a second area 722 for selecting the second application, and a third area 723 for simultaneously selecting the first application and the second application.

According to an embodiment, if the option for selecting both the first and second applications is selected (e.g. if a user input is detected in third area 723), the electronic device 400 may output, on the display 410, execution screens of the first and second applications, where the execution screens are arranged based on information about the layouts of the execution screens.

For example, if the third area 723 included in the first object 720 is selected, the electronic device 400 may output, on the display 410, the execution screen 711 of the first application and the execution screen 712 of the second application, i.e. the applications that corresponded to the first object 720. The electronic device 400 may output the execution screen 711 of the first application and the execution screen 712 of the second application based on information about the layouts thereof. For example, the electronic device 400 may display the execution screen 711 of the first application and the execution screen 712 of the second application in the sizes and positions in which the execution screens 711 and 712 of the first and second applications were previously displayed.

In another example, if the first area 721 included in the first object 720 is selected, the electronic device 400 may output the execution screen 711 of the first application on the display 410. The electronic device 400 may output the execution screen 711 of the first application based on information about the layout thereof. For example, the electronic device 400 may display the execution screen 711 of the first application in the size and position in which the execution screen 711 of the first application was previously displayed. In this case, the electronic device 400 may display the home screen on the remaining area of the display 410.

In another example, if the second area 722 included in the first object 720 is selected, the electronic device 400 may output the execution screen 712 of the second application on the display 410. The electronic device 400 may output the execution screen 712 of the second application based on information about the layout thereof. For example, the electronic device 400 may display the execution screen 712 of the second application in the size and position in which the execution screen 712 of the second application was displayed. In this case, the electronic device 400 may display the home screen on the remaining area of the display 410.

Thus, according to an embodiment, if an application is selected from the provided history, the electronic device may provide the execution screen of the selected application in the same layout in which the selected application was previously displayed. An execution screen of another application may be displayed in the remaining area.

Figure 8:
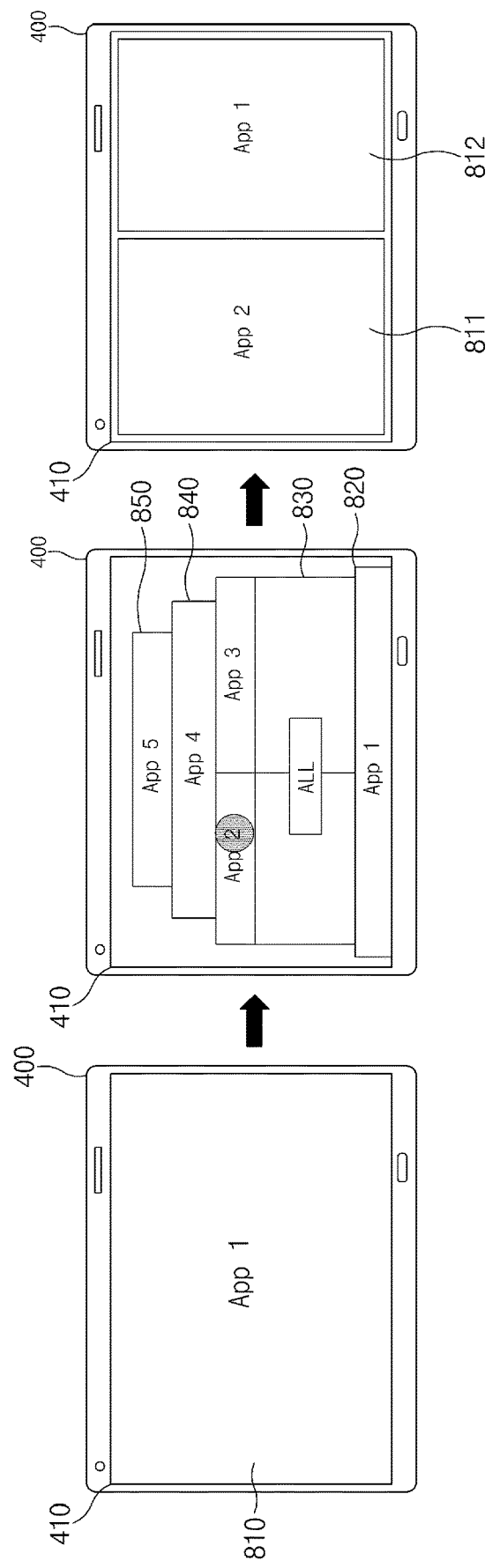
FIG. 8 illustrates application execution screens and a history of executed applications outputted on an electronic device, according to an embodiment.

FIG. 8 illustrates application execution screens and a history of executed applications outputted on an electronic device, according to an embodiment.

It may be understood that operations described as being performed by the electronic device 400 in the description of FIG. 8 are controlled by the processor 450 of the electronic device 400.

Referring to FIG. 8, the electronic device 400 according to an embodiment may execute a first application. The electronic device 400 may display the execution screen 810 of the first application on the entire area of the display 410.

According to an embodiment, while the first application is being executed, the electronic device may receive a user request to display a history of previously executed applications. The electronic device 400 may then display the history of applications previously executed. The history may include a first object 820 corresponding to the first application, a second object 830 corresponding to a second application and a third application, a third object 840 corresponding to a fourth application, and a fourth object 850 corresponding to a fifth application. Similarly to the first object 720 illustrated in FIG. 7, the second object 830 may include a first area for selecting the second application, a second area for selecting the third application, and a third area for selecting both the second application and the third application.

If an option for selecting a part of two or more applications is selected, the electronic device 400 may output, on the display 410, an execution screen of the selected application based on information about the layout of the execution screen of the selected application. The execution screen of the application that was running when the history was requested may also be displayed.

For example, if the first area for selecting the second application included in the second object 830 is selected, the electronic device 400 may display the execution screen 811 of the second application based on information about the layout thereof. The electronic device 400 may display the execution screen 811 of the second application in the size and position in which the execution screen 811 of the second application was previously displayed. The electronic device 400 may display the execution screen 812 of the first application, which was displayed on the display 410 when the history was requested, on the remaining area of the display 410.

In another example, if the second area for selecting the third application included in the second object 830 is selected, the electronic device 400 may display the execution screen of the third application based on information about the layout thereof. The electronic device 400 may display the execution screen of the third application in the size and position in which the execution screen of the third application was previously displayed. For example, the electronic device 400 may display the execution screen of the third application on the area on which the execution screen 812 of the first application is displayed in FIG. 8. The electronic device 400 may display the execution screen 812 of the first application on the remaining area of the display 410. For example, the execution screen 812 of the first application may be displayed in the area where the execution screen 811 of the second application is displayed in FIG. 8.

In another example, if the third area included in the second object 830 is selected, the electronic device 400 may output the execution screen 811 of the second application and the execution screen of the third application on the display 410. For example, based on layout information, the electronic device 400 may display the second application on the area on which the execution screen 811 of the second application is displayed in FIG. 8, and may display the third application on the area on which the execution screen 812 of the first application is displayed in FIG. 8.

According to an embodiment, the electronic device may update the history to prevent repetition of a particular application in the history.

Figure 9:
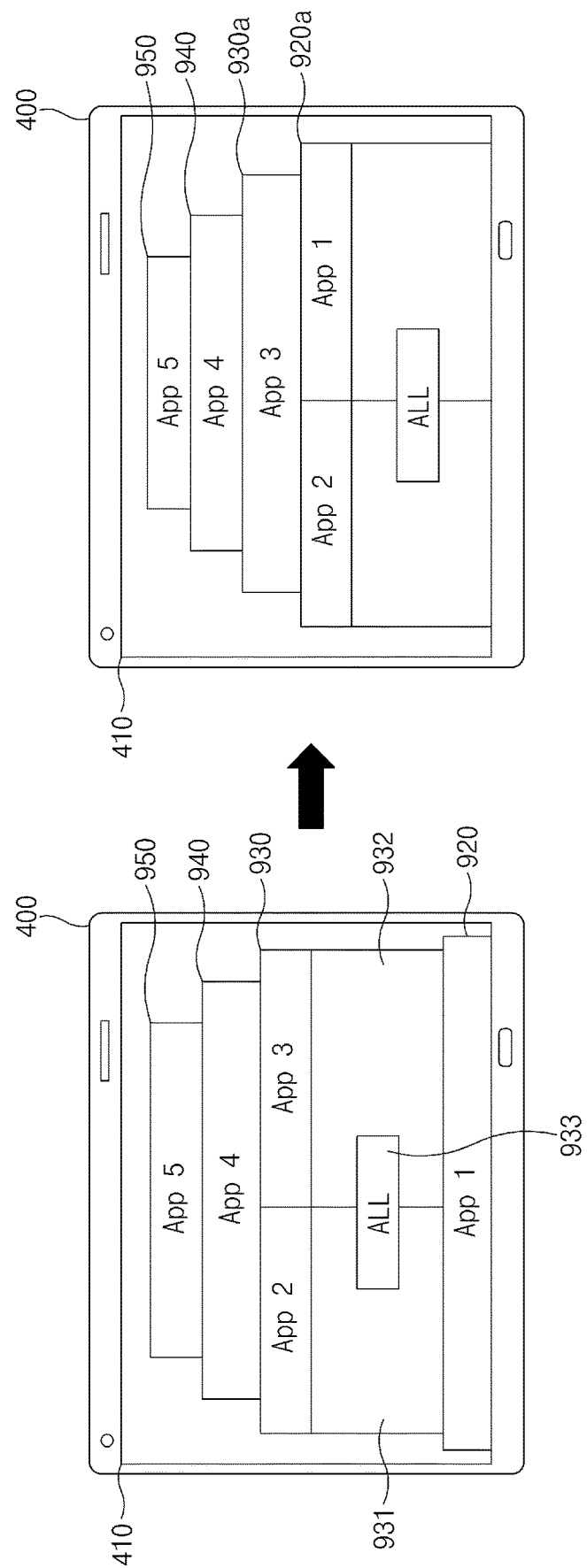
FIG. 9 illustrates application execution screens and a history of executed applications outputted on an electronic device, according to an embodiment.

FIG. 9 illustrates application execution screens and a history of executed applications outputted on an electronic device, according to an embodiment.

It may be understood that operations described as being performed by the electronic device 400 in the description of FIG. 9 are controlled by the processor 450 of the electronic device 400.

Referring to FIG. 9, the electronic device 400 according to an embodiment may display a history of applications while a first application is being executed. The history may include a first object 920 corresponding to the first application, a second object 930 corresponding to a second application and a third application, a third object 940 corresponding to a fourth application, and a fourth object 950 corresponding to a fifth application. The second object 930 may include a first area 931 for selecting the second application, a second area 932 for selecting the third application, and a third area 933 for selecting both the second application and the third application.

According to an embodiment, if an option for selecting a part of two or more applications is selected, the electronic device 400 may change the object corresponding to the selected option such that one application is not repeatedly included in the history.

For example, if the first area 931 for selecting the second application is selected, the electronic device 400 may display the execution screen of the second application and the execution screen of the first application on the display 410, as illustrated in FIG. 8. The electronic device 400 may be requested to display the history again after displaying the execution screens of the second application and the first application. The re-displayed history may include a fifth object 920*a* corresponding to the second application and the first application, a sixth object 930*a* corresponding to the third application, the third object 940 corresponding to the fourth application, and the fourth object 950 corresponding to the fifth application. Thus, if the second application is selected from the second object 930, the electronic device 400 may remove the part corresponding to the second application from the second object 930, in order to change the second object 930 into the sixth object 930*a*. In addition, if the second application is selected from the second object 930, the electronic device 400 may change the first object 920 into the fifth object 920*a* by adding the part corresponding to the second application to the first object 920, so that the first application is displayed together with the second application. By removing the part corresponding to the second application from the second object 930 and adding the removed part to the first object 920, it is possible to prevent the same application from being repeatedly included in the history.

In the following description, the electronic device according to below-described embodiment may be a foldable electronic device.

Figure 10:
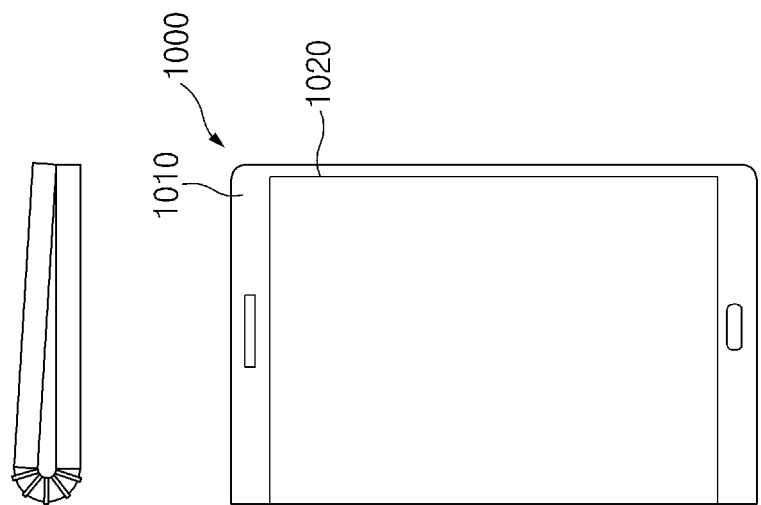
FIG. 10 illustrates the external appearance of an electronic device, according to an embodiment.
Figure 10:
Figure 10:
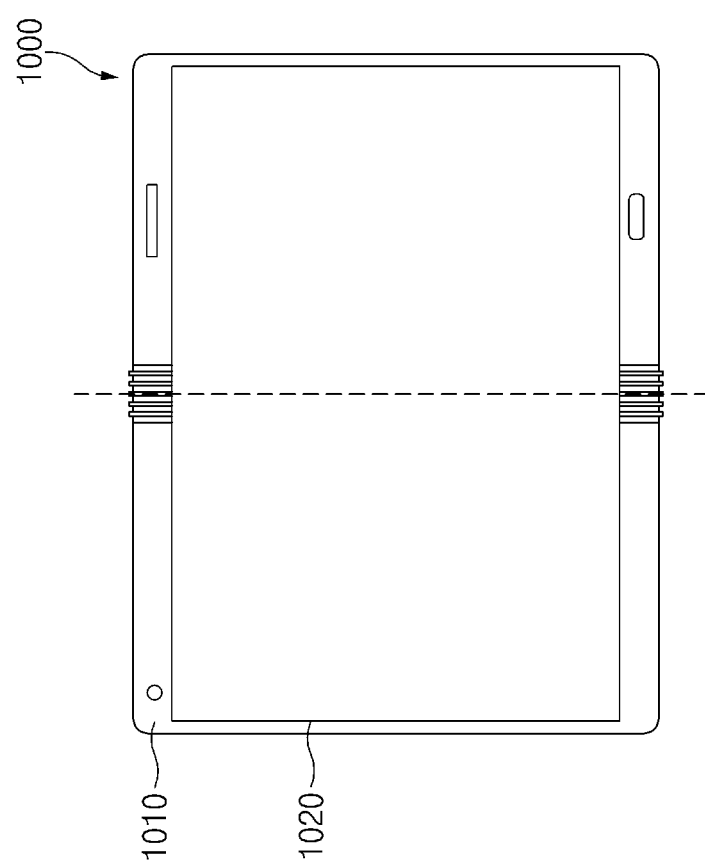

FIG. 10 illustrates the external appearance of an electronic device, according to an embodiment.

Referring to FIG. 10, an electronic device 1000 according to an embodiment may include a housing 1010 and a flexible display 1020. Although not illustrated in FIG. 10, the electronic device 1000 may further include a memory and a processor (e.g., the memory 420 and the processor 450 of FIG. 4) disposed inside the housing 1010.

According to an embodiment, the housing 1010 may include a part that is foldable. For example, the housing 1010 may include hinges along the dotted line illustrated in FIG. 10. By engaging the hinges, the housing 1010 may be folded. In the case where the housing 1010 is folded, the left end and the right end of the housing 1010 may contact each other. Although FIG. 10 illustrates that the hinges are included at the middle of the housing 1010, the hinge are not so limited. For example, hinges may be included at various locations on the housing 1010. Furthermore, the hinges of the housing 1010 may have a different structure from the hinge illustrated in FIG. 10. Moreover, the housing 1010 may not use hinges, but rather use flexible materials instead.

The flexible display 1020 may be bent along with the housing 1010. For example, in the case where the housing 1010 is folded, the flexible display 1020 may be folded together with the housing 1010. The flexible display 1020 may perform the same function as the display 410 illustrated in FIG. 4.

The electronic device 1000 may recognize whether the housing 1010 and the flexible display 1020 are folded. For example, the electronic device 1000 may use a sensor for recognizing the operations of the hinges of the housing 1010, and thus may recognize whether the housing 1010 and the flexible display 1020 are folded. In another example, the electronic device 1000 may use a sensor for recognizing proximity between the left end and the right end of the housing 1010. When the left end and the right end of the housing 1010 are within a preset distance, the electronic device 1000 may recognize that the housing 1010 and the flexible display 1020 are folded. In addition, the electronic device 1000 may use various other methods to recognize whether the housing 1010 and the flexible display 1020 are folded.

In the case where the flexible display 1020 is folded, the electronic device 1000 may activate an area of the flexible display 1020. For example, in the case where the flexible display 1020 is folded along the dotted line illustrated in FIG. 10, the electronic device 1000 may activate the right or left half of the flexible display 1020.

The electronic device 1000 may provide different histories depending on whether the housing 1010 is folded or not.

Figure 11:
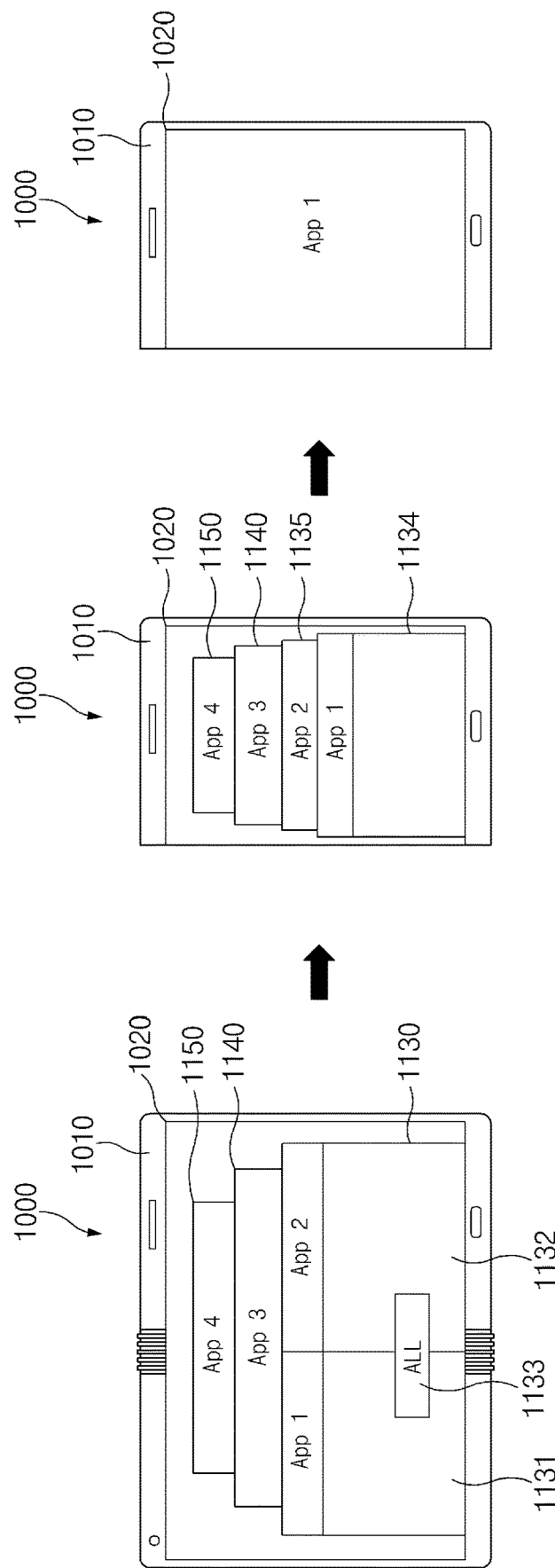
FIG. 11 illustrates application execution screens and a history of executed applications outputted on an electronic device, according to an embodiment.

FIG. 11 illustrates application execution screens and a history of executed applications outputted on an electronic device, according to an embodiment.

It may be understood that operations described as being performed by the electronic device 1000 in the description of FIG. 11 are controlled by the processor of the electronic device 1000.

Referring to FIG. 11, if at least a part of the housing 1010 is folded, the electronic device 1000 according to an embodiment may output a history on an area of the flexible display 1020, where the history may not include layout information.

For example, the electronic device 1000 may display history when the electronic device 1000 is unfolded. The electronic device 1000 may output, on the flexible display 1020, the history that includes a first object 1130 corresponding to a first application and a second application, a second object 1140 corresponding to a third application, and a third object 1150 corresponding to a fourth application. The first object 1130 may include a first area 1131 for selecting the first application, a second area 1132 for selecting the second application, and a third area 1133 for simultaneously selecting both the first application and the second application.

When it is folded however, the electronic device 1000 may display the history differently. The electronic device 1000 may be folded after the history is displayed. Then after being folded, the electronic device 1000 may output, on the flexible display 1020, the history that includes a fourth object 1134 corresponding to the first application, a fifth object 1135 corresponding to the second application, the second object 1140 corresponding to the third application, and the third object 1150 corresponding to the fourth application. Thus as shown, when the electronic device 1000 displays the history while unfolded, the history may reflect previous layout information. But when the history is displayed while the electronic device is folded, the history may not reflect previous layout information.

If the fourth object 1134 is selected, the electronic device 1000 may display the execution screen of the first application corresponding to the fourth object 1134 on the right side (i.e. the operative side) of the flexible display 1020, for example.

Figure 12:
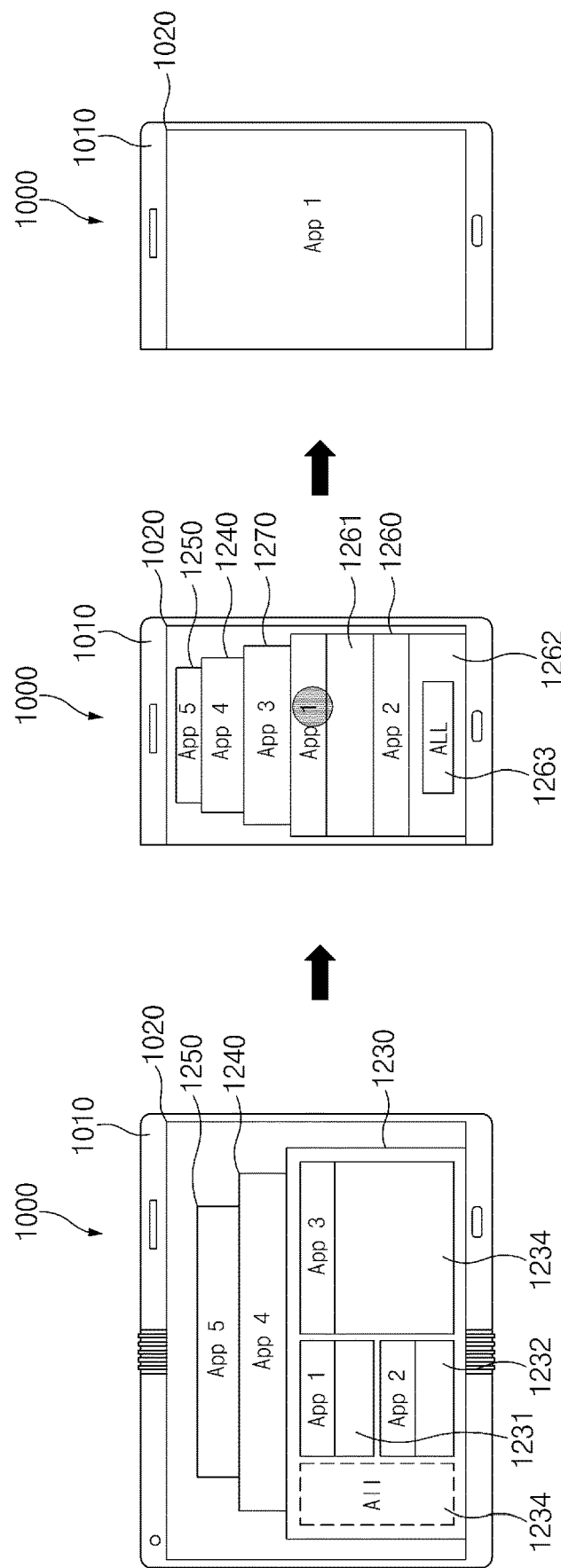
FIG. 12 illustrates application execution screens and a history of executed applications outputted on an electronic device, according to an embodiment.

FIG. 12 illustrates application execution screens and a history of executed applications outputted on an electronic device, according to an embodiment.

It may be understood that operations described as being performed by the electronic device 1000 in the description of FIG. 12 are controlled by the processor of the electronic device 1000.

Referring to FIG. 12, if at least a part of the housing 1010 is folded, the electronic device 1000 may output a history on an area of the flexible display 1020, where the history may still include layout information.

For example, the electronic device 1000 may display a history when the electronic device 1000 is unfolded. The electronic device 1000 may output, on the flexible display 1020, the history that includes a first object 1230 corresponding to first to third applications, a second object 1240 corresponding to a fourth application, and a third object 1250 corresponding to a fifth application. The first object 1230 may include a first area 1231 for selecting the first application, a second area 1232 for selecting the second application, a third area 1233 for selecting the third application, and a fourth area 1234 for selecting all of the first, second, and third applications.

When it is folded however, the electronic device 1000 may display the history differently. The electronic device 1000 may be folded after the history is displayed. Then after being folded, the electronic device 1000 may output, on the flexible display 1020, the history that includes a fourth object 1260 corresponding to the first application and the second application, a fifth object 1270 corresponding to the third application, the second object 1240 corresponding to the fourth application, and the third object 1250 corresponding to the fifth application. In the case where the electronic device 1000 displays the history with the flexible display 1020 in a folded state, the history may include layout information that is suitable for the area of the display on which the history is displayed.

When the electronic device is folded, the layout of the execution screen of the first application and the layout of the execution screen of the second application may be displayed in the history. For example, as shown, the electronic device 1000 may output the fourth object 1260 based on the layouts of the execution screens of the first and second applications. The fourth object 1260 may include a fifth area 1261 corresponding to the first application, a sixth area 1262 corresponding to the second application, and a seventh area 1263 for selecting both the first application and the second application. In this case, since the execution screen of the third application cannot be displayed together with the first application or the second application in the right side area of the flexible display 1020, the electronic device 1000 may separately output the fifth object 1270 corresponding to the third application.

If the fifth area 1261 of the fourth object 1260 is selected, the electronic device 1000 may display the execution screen of the first application on the right side area of the flexible display 1020.

Figure 13:
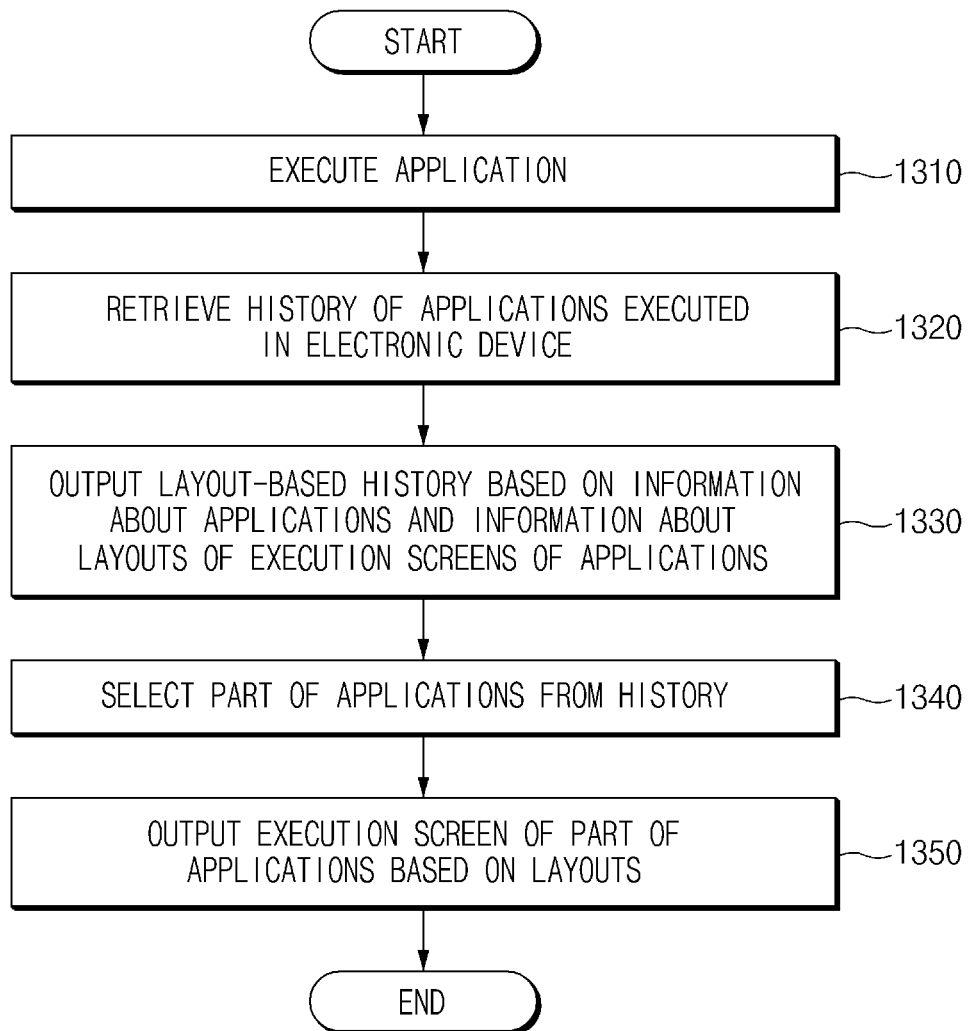
FIG. 13 is a flowchart illustrating a method of displaying a history of executed applications of an electronic device, according to an embodiment.

FIG. 13 is a flowchart illustrating a method of displaying a history of executed applications of an electronic device, according to an embodiment.

Hereinafter, it is assumed that the electronic device 400 of FIG. 4 performs the process illustrated in FIG. 13. Furthermore, it may be understood that operations described as being performed by the electronic device 400 in the description of FIG. 13 are controlled by the processor 450 of the electronic device 400.

Referring to FIG. 13, in operation 1310, the electronic device may execute an application. For example, the electronic device may execute one application or may simultaneously execute a plurality of applications.

In operation 1320, the electronic device may retrieve a history of applications previously executed in the electronic device from memory. For example, the electronic device, if receiving a specified input from a user, may retrieve a history of applications previously executed or currently running in the electronic device.

In operation 1330, based on information about the applications and information about the layouts of execution screens of the applications, the electronic device may output the layout-based history. For example, the electronic device may output the history where the history reflects the positions and sizes of the execution screens when the applications were previously executed.

In operation 1340, the electronic device may select a part of the applications from the history. For example, the electronic device may select all or a part of two or more simultaneously-executed applications from the history.

In operation 1350, the electronic device may output the execution screen of the selected application(s) based on the layout thereof. For example, the electronic device may output the execution screen of the selected application in the same size and/or position as the size and position in which the execution screen of the selected application was previously disposed.

Figure 14:
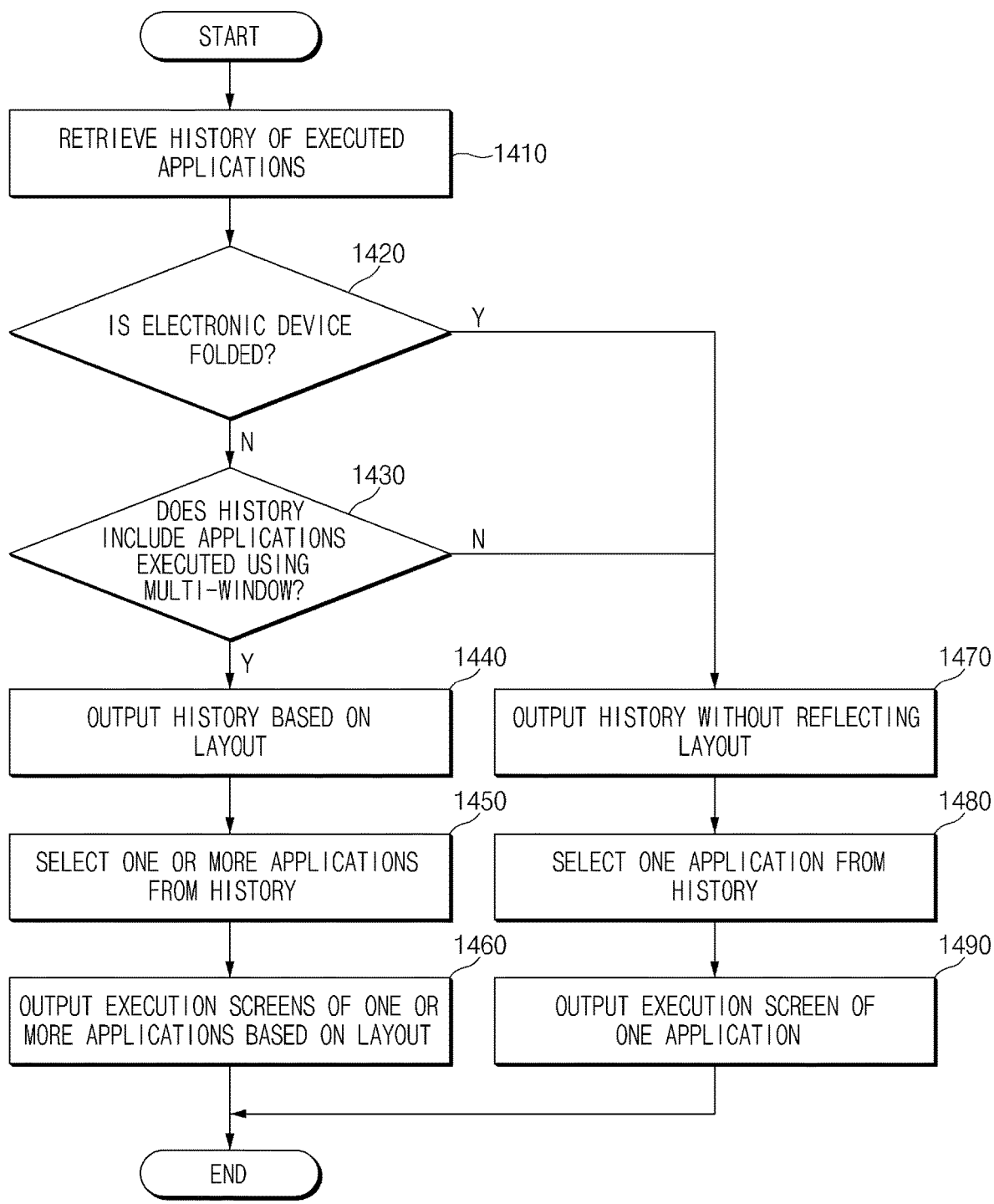
FIG. 14 is a flowchart illustrating a method of displaying a history of executed applications of an electronic device, according to an embodiment.

FIG. 14 is a flowchart illustrating a method of displaying a history of executed applications of an electronic device, according to an embodiment.

Hereinafter, it is assumed that the electronic device 1000 of FIG. 4 performs the process illustrated in FIG. 14. Furthermore, it may be understood that operations described as being performed by the electronic device 1000 in the description of FIG. 14 are controlled by the processor of the electronic device 1000.

Referring to FIG. 14, in operation 1410, the electronic device may retrieve a history of executed applications. For example, the electronic device, if receiving a specified input from a user, may retrieve a history of applications previously executed or currently running in the electronic device from memory.

In operation 1420, the electronic device may determine whether the electronic device is folded. For example, the electronic device may use a sensor to detect whether the electronic device folded.

When the electronic device is unfolded state, the electronic device may, in operation 1430, determine whether the history includes applications that were simultaneously executed using multi-windowing. For example, the electronic device may use an activity manager to determine whether, among executed applications, there are applications displayed on a multi-window.

When the history includes applications that were previously executed in a multi-window, the electronic device may, in operation 1440, output the history based on the layout of the multi-window. For example, the history may reflect the positions and/or sizes of the execution screens of the applications when they were previously executed.

In operation 1450, the electronic device may select one or more applications from the history. For example, the electronic device may select all or a part of two or more simultaneously-executed applications from the history.

In operation 1460, the electronic device may output execution screens of the selected applications based on the layouts. For example, the electronic device may output the execution screens of the selected applications in the same sizes and/or positions as the sizes and positions in which the execution screens of the selected applications were previously disposed.

When the electronic device is in the folded state or when the history does not include applications that were simultaneously executed using multi-windowing, the electronic device may, in operation 1470, output a history that does not reflect layouts. For example, the electronic device may output a history where each object in the history corresponds to a single application.

In operation 1480, the electronic device may select an application from the history. For example, the electronic device may select one of a plurality of applications included in the history.

In operation 1490, the electronic device may output the execution screen of the selected application. For example, the electronic device may output the execution screen of the selected application on the entire area of the display.

The term "module" used in this disclosure may include a unit composed of hardware, software and firmware and may be interchangeably used with the terms "unit," "logic," "logical block," "component," "circuit," etc. The "module" may be an integrated component for performing one or more functions. The "module" may be implemented mechanically or electronically and may be an application-specific IC (ASIC) chip, a field-programmable gate array (FPGA), a programmable-logic device, etc. At least a part of an apparatus (e.g., modules or functions thereof) or a method (e.g., operations) according to various embodiments may be, for example, implemented by commands stored in computer-readable storage media (e.g., the memory 130) in the form of a program module. The instruction(s), when executed by a processor (e.g., the processor 120), may cause the processor to perform function(s) corresponding to the instruction(s). A computer-readable recording medium may include a hard disk, a floppy disk, a magnetic media (e.g., a magnetic tape), an optical media (e.g., a compact disc read only memory (CD-ROM), a digital versatile disc (DVD), a magneto-optical media (e.g., a floptical disk)), and an internal memory. Also, program instructions may include not only binary codes such as those generated by a compiler but also high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touchscreen display;
memory storing instructions; and
at least one processor,
wherein the instructions that, when executed by the at least one processor, cause the electronic device to:
display, via the touchscreen display, a first screen including a first execution screen and a second execution screen concurrently, the first execution screen corresponding to a first application, and the second execution screen corresponding to a second application;
while the first execution screen and the second execution screen are concurrently displayed, receive a first input;
in response to the first input, display, via the touchscreen display, a plurality of graphical objects indicative of a history of applications recently executed, the plurality of graphical objects including a first graphical object indicative of the first screen, the first graphical object including a first part corresponding to the first execution screen and a second part corresponding to the second execution screen; and
removing the first part from the first graphical object based at least in part on the first part being selected while the first graphical object is displayed.

2. The electronic device of claim 1, wherein the first input includes a touch input on the touchscreen display.

3. The electronic device of claim 1, wherein a ratio of the first part and the second part in the first graphical object corresponds to a ratio of the first execution screen and the second execution screen in the first screen.

4. The electronic device of claim 1, wherein the instructions that, when executed by the at least one processor, cause the electronic device to: in response to the first input, display a second graphical object indicative of a third screen including a third execution screen corresponds to a third application.

5. The electronic device of claim 1, wherein the instructions that, when executed by the at least one processor, cause the electronic device to: resize the second part in the first graphical object after removing the first part from the first graphical object.

6. A method comprising:
displaying, via a touchscreen display, a first screen including a first execution screen and a second execution screen concurrently, the first execution screen corresponding to a first application, and the second execution screen corresponding to a second application;
while the first execution screen and the second execution screen are concurrently displayed, receiving a first input;
in response to the first input, displaying, via the touchscreen display, a plurality of graphical objects indicative of a history of applications recently executed, the plurality of graphical objects including a first graphical object indicative of the first screen, the first graphical object including a first part corresponding to the first execution screen and a second part corresponding to the second execution screen; and
removing the first part from the first graphical object based at least in part on the first part being selected while the first graphical object is displayed.

7. The method of claim 6, wherein the first input includes a touch input on the touchscreen display.

8. The method of claim 6, wherein a ratio of the first part and the second part in the first graphical object corresponds to a ratio of the first execution screen and the second execution screen in the first screen.

9. The method of claim 6, further comprising:
in response to the first input, displaying a second graphical object indicative of a third screen including a third execution screen corresponds to a third application.

10. The method of claim 6, further comprising:
resizing the second part in the first graphical object after removing the first part from the first graphical object.

11. A non-transitory computer readable medium storing a plurality of instructions wherein execution of the plurality of instructions by at least one processor, causes the at least one processor to performing a plurality of operations comprising:
displaying, via a touchscreen display, a first screen including a first execution screen and a second execution screen concurrently, the first execution screen corresponding to a first application, and the second execution screen corresponding to a second application;
while the first execution screen and the second execution screen are concurrently displayed, receiving a first input;

in response to the first input, displaying, via the touchscreen display, a plurality of graphical objects indicative of a history of applications recently executed, the plurality of graphical objects including a first graphical object indicative of the first screen, the first graphical object including a first part corresponding to the first execution screen and a second part corresponding to the second execution screen; and removing the first part from the first graphical object based at least in part on the first part being selected while the first graphical object is displayed.

12. The non-transitory computer readable medium of claim 11, wherein the first input includes a touch input on the touchscreen display.

13. The non-transitory computer readable medium of claim 11, wherein a ratio of the first part and the second part in the first graphical object corresponds to a ratio of the first execution screen and the second execution screen in the first screen.

14. The non-transitory computer readable medium of claim 11, wherein the plurality of operations further comprises:

in response to the first input, displaying a second graphical object indicative of a third screen including a third execution screen corresponds to a third application.

15. The non-transitory computer readable medium of claim 11, wherein the plurality of operations further comprises:

resizing the second part in the first graphical object after removing the first part from the first graphical object.

* * * * *